3,032,586
Patented May 1, 1962

3,032,586
HYDROGENATION OF DINITROTOLUENE TO TOLUYLENE DIAMINE
Helmut Dierichs, Leverkusen, and Hermann Holzrichter, Leverkusen-Bayerwerk, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Apr. 18, 1957, Ser. No. 653,535
Claims priority, application Germany Nov. 13, 1953
5 Claims. (Cl. 260—580)

This invention relates generally to the manufacture of toluylene diamine from dinitrotoluene and, more particularly, to a novel and improved method for making toluylene diamine by catalytic hydrogenation of dinitrotoluene. This application is a continuation-in-part of our copending application Serial No. 468,146, filed November 10, 1954, and now abandoned.

It has been proposed heretofore to manufacture aromatic amines by hydrogenating the corresponding nitro-substituted compound. Such a process is disclosed, for example, in U.S. Patent 2,619,503. As pointed out in that patent, the polynitro compounds which are reduced to form the corresponding diamine are strong oxidizing agents and explosives, so the use of the conventional iron, tin, zinc and similar catalysts at the temperatures required for the reduction process is ordinarily hazardous. The patentees propose to conduct the reduction process while the dinitro compound is associated with a palladium or platinum catalyst in order that the reduction may be carried out at temperatures ranging from about 40° C. to about 100° C. and, preferably, within the range of from about 65° C. to 80° C. Temperatures above 100° C. and the use of a nickel catalyst are not recommended by these patentees because of the hazardous nature of the reaction. Although such a process may be substantially non-hazardous, the use of palladium or platinum as a catalyst and operation at temperatures of less than 100° C. are impractical and costly because of the low rate of reduction of the dinitro compound into the corresponding diamine and the unavoidable loss of catalyst in large scale operation.

It has also been proposed to catalytically hydrogenate nitro compounds to produce the corresponding aromatic amine in a liquid-vapor phase process in which the nitro compound is maintained in a liquid state and the diamine is withdrawn as a vapor. However, the volatility of aromatic diamines, such as, for example, toluylene diamine, is too low for such a process to be of any significant commercial value.

It is therefore on object of this invention to provide an improved process for the catalytic hydrogenation of dinitrotoluene which may be conducted at temperatures where the product is obtained in commercially feasible quantities without subjecting the equipment and personnel to hazardous conditions. Another object of the invention is to provide a process for making toluylene diamine from dinitrotoluene which is a non-hazardous process and uses a relatively inexpensive catalyst. A still further object of the invention is to provide a process for making toluylene diamine in improved yields without the formation of substantially large quantities of by-product residues, such as, toluidine and other high-boiling products. Still other objects will become apparent from the following description.

As pointed out in the aforesaid copending application, the foregoing objects as well as others are accomplished in accordance wtih this invention by providing a process for hydrogenating dinitrotoluene in the liquid phase by heating a flowing stream of a solution of dinitrotoluene containing Raney nickel to a temperature of at least about 80° C. while subjecting the liquid to a pressure of about 50 atmospheres or more. In accordance with this process, the dinitrotoluene is dissolved in a suitable solvent which is preferably methanol and the resulting solution is flowed in a continuous stream through suitable equipment operating at a pressure of about 50 atmospheres or more and at a temperature of about 80° C. or more while in the presence of particles of Raney nickel. As set forth in the copending application, it is preferred to operate at temperatures of from about 80° C. to about 120° C. at the aforesaid pressure. As the temperature increases above this point, the process becomes more hazardous, but it has been found through additional experimental work that higher temperatures of up to about 170° C. may be utilized provided the solution of dinitrotoluene is continuously flowing through the equipment. Indeed, there is some advantage to operating at temperatures within the range of 120° C. to 170° C. because less residue of undesirable chemical composition is formed and because the yield of product per unit of time is greater. The reduction of the dinitro compound to the corresponding diamine proceeds much more rapidly at these temperatures than at lower temperatures, so the rate of flow of solution through the equipment can be greater and the yield thus obtained will be greater. In order to provide a process wherein the hazard involved is held at a minimum and the yield is sufficiently great to be commercially feasible, it is preferred to operate at temperatures within the neighborhood of about 115° C. to about 130° C. Temperatures above 170° C. should be avoided in most instances in order to avoid explosion of the mixture.

In order to be able to operate the above temperatures while the solution contains Raney nickel as a catalyst, the solution of toluylene diamine must be continuously moving. This is illustrated by the fact that in a batchwise process in which about 800 grams of dinitrotoluene dissolved in about 2400 grams of methanol was hydrogenated by contacting the solution with an excess of hydrogen in the presence of Raney nickel, about 140 minutes were required to reduce the dinitrotoluene and form the corresponding diamine. In contrast thereto, in a process where a flowing stream of dinitrotoluene was hydrogenated by exposure to hydrogen while in the presence of a Raney nickel catalyst, about 350 grams of dinitrotoluene dissolved in about three times its volume of methanol was reduced to the corresponding diamine within about 1 hour. In each instance, the solution was heated to about 100° C. while subjected to about 180 atmospheres pressure. A reaction space of about 450 liters was used in the continuous process.

The toluylene diamine obtained by the process provided by this invention is more than 99% chemically pure. Any suitable amount of catalyst may be used, but ordinarily from about 0.1% to 0.3%, and not more than 0.5%, will be consumed in the process. Because of the continuous nature of the process, the evolution of heat is steady and no difficulties are encountered in controlling the hydrogenation temperature.

As pointed out above, the amount of residue of undesired products formed during the hydrogenation is less at the higher temperatures than temperatures of 100° C. or less. For example, about 5% of the starting amine is converted into undesirable residue products when the hydrogenation is conducted at 100° C., about 2% of the amine is converted to undesirable residue when the reaction is conducted at 130° C. and only about 1% of undesirable residue is formed when the reaction is conducted at 170° C.

The hydrogenation in accordance with the invention may be conducted in any suitable inert diluent, such as dioxane or tetrahydrofurane, but it is preferably carried out in low molecular alcohols, such as methanol and ethanol.

In accordance with a specific embodiment, a solution of dinitrotoluene in methanol, which contains a small amount of Raney nickel, is pumped in a continuous stream along with hydrogen through a high pressure reactor at a temperature within the range of from about 80° C. to about 120° C. and at a pressure of about 200 atmospheres. The heat evolved in the reaction is abstracted by suitable cooling means. It is advisable to recirculate to the reaction zone the excess hydrogen which has been withdrawn therefrom, the circulating gas serving to stir the reaction mixture and to maintain the catalyst in suspension. The methanolic solution of toluylene diamine flowing from the reactor is freed of methanol by continuous distillation in a column. The batch, which contains the toluylene diamine formed and the reaction water, is worked up by distillation with the aid of a falling film evaporator.

In accordance with a preferred embodiment of the invention, in place of pure dinitrotoluene, a mixture consisting of dinitrotoluene and toluylene diamine is subjected to the hydrogenation. As may be seen from the following table, the melting point of dinitrotoluene can considerably be lowered by mixing it with toluylene diamine, a mixture consisting of about 76% of dinitrotoluene and 24% of toluylene diamine being an eutectic mixture which has the lowest solidification point (26° C.). The values shown in the table were obtained with a dinitrotoluene obtained by nitration of o-nitrotoluene and consisting of about 30% of 2,6-dinitrotoluene and about 70% of 2,4-dinitrotoluene, and with a toluylene diamine obtained therefrom by hydrogenation.

*Table 1*

| Percent dinitrotoluene (mixture consisting of 2,6- and 2,4-dinitrotoluene) | Percent toluylene diamine (mixture consisting of 2,6- and 2,4-diaminotoluene) | Solidification point, ° C. |
| --- | --- | --- |
| 0 | 100 | 74 |
| 29.4 | 70.6 | 61 |
| 52.2 | 47.8 | 33.3 |
| 68.5 | 31.5 | 27.3 |
| 76.0 | 24.0 | 26.0 |
| 90.0 | 10.0 | 42.0 |
| 100.0 | 0 | 48.8 |

The use of mixtures of dinitrotoluene and toluylene diamine in the hydrogenation has the advantage of reducing the wear of the moving parts (piston rods, valves, etc.) of the feeding pumps, for it has been observed that the hard crystals of dinitrotoluene may spoil these pumps within a relatively short time. The detrimental action of the hard crystals of dinitrotoluene on the moving parts of the feeding pumps cannot be remedied by operating in high dilutions. Thus, the use of a low melting mixture of dinitrotoluene and toluylene diamine in place of dinitrotoluene provides for an important economy in the operating costs.

While various mixtures of dinitrotoluene and toluylene diamine may be subjected to the hydrogenation in accordance with the invention, it is particularly advantageous to use the eutectic mixture consisting of about 75% of dinitrotoluene and 25% of toluylene diamine. This mixture is preferably hydrogenated upon dilution with a certain amount of methanol.

In operation, the feed may be prepared by mixing fresh dinitrotoluene with such an amount of hydrogenation product as to obtain a mixture of about 75% dinitrotoluene and 25% toluylene diamine. Thus, a feed suitable for the process of the invention consists of 750 kilograms of dinitrotoluene, 763.6 kilograms of a methanolic solution of the hydrogenation product and 736.4 kilograms of methanol. The methanolic solution of the hydrogenation product consists of 32.74% of toluylene diamine, 19.32% of water and 47.94% of methanol. This means that 250 kilograms of toluylene diamine, 147.5 kilograms of water and 366.1 kilograms of methanol are recirculated to the hydrogenation in form of the above methanolic solution. In other words, a mixture of dinitrotoluene and toluylene diamine having the composition of the eutectic mixture in 88.2% methanol is subjected to the hydrogenation, the dilution being 1:2, since 2 parts of toluylene diamine and diluent are used for 1 part of dinitrotoluene.

The advantages offered by the process of the invention are as follows: (a) high yield per unit volume of reactor space per unit time; (b) low catalyst consumption; (c) high purity of product; (d) no explosion hazards. In addition to these advantages the use of mixtures of dinitrotoluene and toluylene diamine in the hydrogenation according to the preferred embodiment of the invention has the following virtues: (a) excessive wear of the piston rods and valves of the feeding pumps is avoided; and (b) in view of the use of the solution of the hydrogenation product as the diluent only ⅓ of the usual quantity of diluent has to be distilled, which means a considerable economy in distillation equipment and heat expenditure.

The invention is further illustrated by the following examples without being limited thereto:

*Example 1*

The hydrogenation apparatus used consists of 3 high pressure reactors and 1 auxiliary reactor established in series. The reactors are provided with cooling means, preferably consisting of 2 separate sheaves of water tubes so that the cooling can be controlled very exactly. The main reactors are 6 meters in length and 350 millimeters in diameter, which corresponds to a capacity of about 450 liters. By properly adjusting the quantity of water in the cooling tubes, the temperature in the system is maintained at the same level of about 100° C. The hydrogen pressure is maintained at between 150 to 200 atmospheres. To each reactor tube there are fed per 1 hour 1000 parts of a mixture containing methanol and dinitrotoluene in the ratio of 3:1 and Raney nickel suspended therein. The hydrogen is introduced concurrently. At the end of the system the hydrogen is withdrawn from a separator by means of a recirculating pump. The methanolic solution of the hydrogenation product is depressured, filtered and continuously freed of methanol and water. Thus, toluylene diamine of 98% to 99% purity, which is practically free of dinitrotoluene, is obtained. The catalyst consumption is below 0.5%.

*Example 2*

Using the hydrogenation apparatus and the operating conditions described in Example 1, a mixture consisting of 750 kilograms of dinitrotoluene, 763.6 kilograms of the methanolic solution of the hydrogenation product (not filtered and containing the catalyst Raney nickel employed in a previous run), and 736.4 kilograms of methanol is subjected to the hydrogenation after a small quantity of fresh Raney nickel (about 0.5 to 1.5 kilograms) has been added thereto. Only at the beginning of a hydrogenation period a somewhat greater amount of catalyst, for example 40 kilograms of used Raney nickel and 1 to 2 kilograms of fresh Raney nickel, is added. About 1440 kilograms per hour of the feed are introduced into the first reactor and 720 kilograms per hour are introduced into the second and third reactor. Alternatively, to each reactor there may be fed the same amount of feed (i.e., 960 kilograms per hour), but in general it has been found advantageous to operate the first reactor with a higher throughput. The hydrogen is introduced concurrently. The agitation is brought about by a pump which circulates about 3 cbm. of hydrogen per hour. The hydrogen used up in the hydrogenation is made up by fresh hydrogen. From a separator at the end of the system the hydrogen is withdrawn by means of a recirculating pump. Part of the methanolic solution of the hydrogenation product is recirculated in accordance with the above weight ratio. The remaining part of the solution is filtered and continuously freed of methanol and water by distillation. Thus, toluylene diamine of 98% to 99% purity, which is practically free of dinitrotoluene, is obtained. The catalyst consumption is below 0.3%.

*Example 3*

Using the hydrogenation apparatus described in Example 1, a mixture consisting of dinitrotoluene, methanol, water and Raney nickel is fed into the first three high pressure reactors. This reaction mixture consists of 736.6 kilograms of the methanolic solution of the hydrogenation product (not filtered and containing the catalyst Raney nickel employed in a previous run), 736.4 kilograms of methanol, 750 kilograms of dinitrotoluene and 0.5 to 1.5 kilograms of fresh Raney nickel. At the beginning of a hydrogenation period a larger amount of catalyst, for example, 40 kilograms of used Raney nickel and 1 to 2 kilograms of fresh Raney nickel are added. About 2000 kilograms per hour of this feed are introduced into each of the three high pressure reactors by means of a high pressure pump. The reduction is carried out by introducing hydrogen concurrently, the reaction temperature being 170° C. and the pressure being about 100 atmospheres. From a separator at the end of the system the reaction product is continuously withdrawn. From the top of this separator the hydrogen is withdrawn by means of a recirculating pump. This hydrogen is again introduced in the first of the three high pressure reactors. Part of the methanolic solution of the hydrogenation product is recirculated as described above. The remaining part of the reaction product is filtered and continuously freed from methanol and water by distillation. Thus, toluylene diamine of 99% purity which is practically free of dinitrotoluene is obtained. The formation of residue is about 1%. The catalyst consumption is below 0.3%.

Although the invention has been described in considerable detail in the foregoing in order to properly illustrate the invention, it is to be understood that the purpose of such detail is solely to illustrate the embodiments of the invention and that modifications can be made by those skilled in the art without departing from the spirit or scope of the invention except as is set forth in the claims.

What is claimed is:

1. The improved method of making toluylene diamine by hydrogenating dinitrotoluene in the presence of a catalyst comprising, subjecting a flowing stream of a solution of an eutectic mixture of dinitrotoluene and toluylene diamine in an inert organic solvent for the two compounds and hydrogen to a pressure of at least about 50 atmospheres and a temperature of from about 80° C. to about 120° C. while said solution has particles of Raney nickel suspended therein until nitro groups of the dinitrotoluene have been converted into amino groups, and thereafter separating the reaction product from the liquid phase and any residual Raney nickel.

2. The process of claim 1 wherein said solution is a methanolic solution.

3. The process of claim 1 wherein part of the reaction product is mixed with fresh dinitrotoluene to form said eutectic mixture.

4. The improved method of making toluylene diamine by hydrogenating dinitrotoluene in the presence of a catalyst comprising, subjecting a flowing stream of a solution of an eutectic mixture of dinitrotoluene and toluylene diamine in an inert organic solvent for the two compounds and hydrogen to a pressure of at least about 50 atmospheres and a temperature of at least about 80° C. while said solution has particles of Raney nickel suspended therein until nitro groups of the dinitrotoluene have been converted into amino groups, and thereafter separating the reaction product from the liquid phase and any residual Raney nickel.

5. The improved method of making toluylene diamine by hydrogenating dinitrotoluene in the presence of a catalyst comprising, subjecting a flowing stream of a solution of an eutectic mixture of dinitrotoluene and toluylene diamine in an inert organic solvent for the two compounds and hydrogen to a pressure of at least about 50 atmospheres and a temperature of from about 80° C. to about 170° C. while said solution has particles of Raney nickel suspended therein until nitro groups of the dinitrotoluene have been converted into amino groups, and thereafter separating the reaction product from the liquid phase and any residual Raney nickel.

References Cited in the file of this patent

UNITED STATES PATENTS

| | | |
|---|---|---|
| 2,292,879 | Kise | Aug. 11, 1942 |
| 2,458,214 | Souders | Jan. 4, 1949 |
| 2,464,044 | Kamlet | Mar. 8, 1949 |
| 2,619,503 | Benner et al. | Nov. 25, 1952 |
| 2,811,555 | Larive et al. | Oct. 29, 1957 |
| 2,823,235 | Graham | Feb. 11, 1958 |

West: Journal of the Chemical Society, vol. 127: pages 494–495 (1925).